(12) United States Patent
Luo

(10) Patent No.: US 7,175,752 B2
(45) Date of Patent: Feb. 13, 2007

(54) METHOD AND APPARATUS FOR ELECTROCHEMICAL MACHINING

(75) Inventor: Yufeng Luo, Ann Arbor, MI (US)

(73) Assignee: Federal-Mogul Worldwide, Inc., Southfield, MI (US)

(*) Notice: Subject to any disclaimer, the term of this patent is extended or adjusted under 35 U.S.C. 154(b) by 250 days.

(21) Appl. No.: 10/442,472

(22) Filed: May 21, 2003

(65) Prior Publication Data
US 2003/0217930 A1    Nov. 27, 2003

Related U.S. Application Data

(60) Provisional application No. 60/382,951, filed on May 24, 2002.

(51) Int. Cl.
*B23H 3/00* (2006.01)
(52) U.S. Cl. .................................. 205/644
(58) Field of Classification Search ............... 205/644
See application file for complete search history.

(56) References Cited

U.S. PATENT DOCUMENTS

| | | | |
|---|---|---|---|
| 3,607,689 A * | 9/1971 | Inoue | 205/649 |
| 3,627,667 A | 12/1971 | Plofsky | |
| 3,798,141 A | 3/1974 | Yahalom | |
| 3,959,088 A | 5/1976 | Sullivan | |
| 4,113,587 A | 9/1978 | Chikamori | |
| 4,125,444 A * | 11/1978 | Inoue | 205/643 |
| 4,487,671 A | 12/1984 | McGeough | |
| 4,659,894 A * | 4/1987 | Inoue | 219/69.18 |
| 4,880,509 A * | 11/1989 | Kuwabara et al. | 205/641 |
| 4,885,066 A | 12/1989 | Kuwabara et al. | |
| 5,143,586 A | 9/1992 | Ozaki et al. | |
| 5,242,556 A | 9/1993 | Masuzawa | |
| 6,007,694 A | 12/1999 | Walsh et al. | |
| 6,023,178 A | 2/2000 | Shioya et al. | |
| 6,214,200 B1 | 4/2001 | Altena et al. | |
| 6,231,748 B1 | 5/2001 | Agafonov et al. | |
| 2002/0169516 A1* | 11/2002 | Brussee et al. | 700/162 |

* cited by examiner

*Primary Examiner*—Roy King
*Assistant Examiner*—Michael P. Alexander
(74) *Attorney, Agent, or Firm*—Robert L. Stearns; Dickinson Wright PLLC

(57) ABSTRACT

An electrochemical machining apparatus and method for machining a workpiece. The apparatus provides a pulse of electric power, which is conducted from the workpiece, to an electrolyte flowing through a gap, and then to an electrode. Material is eroded from the workpiece when the pulse of electric power is applied, thus machining the workpiece. The apparatus includes a power supply to supply the electric power and a switching portion for producing the pulse by switching the electric power ON and OFF. The switching portion is capable of producing a pulse of electric power with a pulse duration of about 2 microseconds and a current of at least about 2800 amperes.

12 Claims, 5 Drawing Sheets

(PRESENT INVENTION)

METHOD AND APPARATUS FOR ELECTROCHEMICAL MACHINING

This patent application claims priority to U.S. Provisional Patent Application No. 60/382,951 filed on May 24, 2002.

BACKGROUND OF THE INVENTION

1. Field of the Invention

The subject invention relates to electrochemical machining (ECM) apparatus and processes utilizing a pulsed-power supply.

2. Description of the Related Art

ECM apparatus and methods using pulsed power are well known in the related art. Typically, a pulse of electric power is transmitted to an electrode, through a gap of an electrolyte, to a workpiece. This process results in the erosion, or machining, of the workpiece.

An early example of this technology is seen in U.S. Pat. No. 3,607,689. The '689 patent discloses an ECM apparatus capable of providing a pulse of electric power. Triggering a silicon controller rectifier (SCR) to discharge a capacitor generates this pulse of electric power. The pulse of electric power has a maximum current of 300,000 amperes. However, due to the slow switching time of the SCR, the minimum pulse duration achieved by the apparatus is only one millisecond.

Another example of an ECM apparatus is revealed in U.S. Pat. No. 4,113,587. This ECM apparatus is capable of producing a pulse of electric power with a minimum duration of 10 microseconds. The pulse of electric power has a maximum current of 300 amperes/cm However, the ECM apparatus of the '587 patent cannot produce a pulse with a minimum duration of less than 10 microseconds and effectively provide an electric charge to an electrode and a workpiece to machine the workpiece.

SUMMARY OF THE INVENTION AND ADVANTAGES

The invention provides an electrochemical machining apparatus comprising a power supply to provide a DC electric power having a direct current. A switching portion is connected to the power supply to interrupt the DC electric power. The switching portion is capable of producing a pulse of DC electric power having a current greater than 100 amperes and a minimum pulse duration of less than 10 microseconds. A controller is operatively connected to the switching portion to control the switching portion. An electrode is also connected to the switching portion. A workpiece is positioned near the electrode to form a gap between the workpiece and the electrode. An electrolyte supply is included to provide an electrolyte to flow through the gap. The electrolyte is in contact with the workpiece and the electrode and creates an electrical circuit for the pulse of DC electric power to conduct through.

The subject invention also provides a method for electrochemically machining a workpiece. The method comprises the steps of positioning an electrode near the workpiece to form a gap between the electrode and the workpiece, providing a flow of an electrolyte through the gap, forming a circuit to allow electrical power to flow through the electrode, the electrolyte in the gap, and the workpiece, and generating a pulse of electrical power with a current greater than 100 amperes and a minimum pulse duration of less than 10 microseconds to erode material from the workpiece.

The ability of the subject invention to generate a pulse of electric power with a minimum pulse duration of less than 10 microseconds and a current greater than 100 amperes provides several advantages over the related art. One such advantage is an increase in a leveling power over the related art. Leveling power may be defined as how quickly the workpiece can be eroded to match the shape of the electrode. More specifically, leveling power may be defined as $L=(e_0-e_1)/S$, where $e_0$ is an amount of an initial surface variation of the workpiece before the pulses of electric power are applied, $e_1$ is an amount of a final surface variation of the workpiece after the pulses of electric power are applied, and S is the amount of sacrificial stock of the workpiece that has been eroded away. FIGS. 5a and 5b show the differences in leveling power between the related art and the present invention. The sacrificial stock (S) and final surface variation ($e_1$) of the present invention are less than can be achieved by the related art. Particularly, the final surface variation ($e_1$) of the present invention is less than about 10 micrometers (microns). The final surface variation ($e_1$) of the related art is greater than about 10 micrometers.

There are three ways the subject invention provides a higher leveling power than the related art. First, the subject invention will produce less eroded material on the workpiece 60 per pulse than the related art. Therefore, the eroded material can be flushed away, or "cleaned-up", faster than is possible with the related art.

Second, the pulses less than 10 microseconds of the subject invention use a transit-effect to erode peaks 7 on an initial surface 6 of the workpiece 60 before eroding valleys 8 of the initial surface 6. Referring to FIGS. 5a and 5b, the initial surface 6 includes peaks 7 and valleys 8, wherein the peaks 7 are closer to the electrodes 58 than are the valleys 8. A varying capacitance and a resistance occur between the electrode 58 and the initial surface 6. The capacitance is less between the electrode 58 and the peaks 7 than between the electrode 58 and the valleys 8. The capacitance must be fully saturated by the pulse of electrical power before the current can flow between the electrode 58 and the workpiece 60, thus eroding the workpiece 60. Therefore, with pulses less than 10 microseconds, the pulse may end after the capacitance is saturated between the electrode 58 and the peaks 7, but may end before the capacitance is saturated between the electrode 58 and the valleys 8. Therefore, the peaks 7 of the workpiece 60 will be eroded before the valleys 8, providing a more even final surface 9 of the workpiece 58 than can be provided by the related art.

Third, the leveling power is further increased by a reduced polarization between the electrode 58 and the workpiece 60 than is achieved by the related art. With less polarization, the current between the electrode 58 and the peak of the workpiece 60 will be greater than the current between the electrode 58 and the valley of the workpiece 60. Since the current flowing to the peaks 7 is higher than the current flowing to the valleys 8, the peaks 7 will be eroded faster than the valleys 8. Again, this will quickly provide a more even final surface 9 of the workpiece 60 with a smaller final surface variation ($e_1$) than can be provided by the related art.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
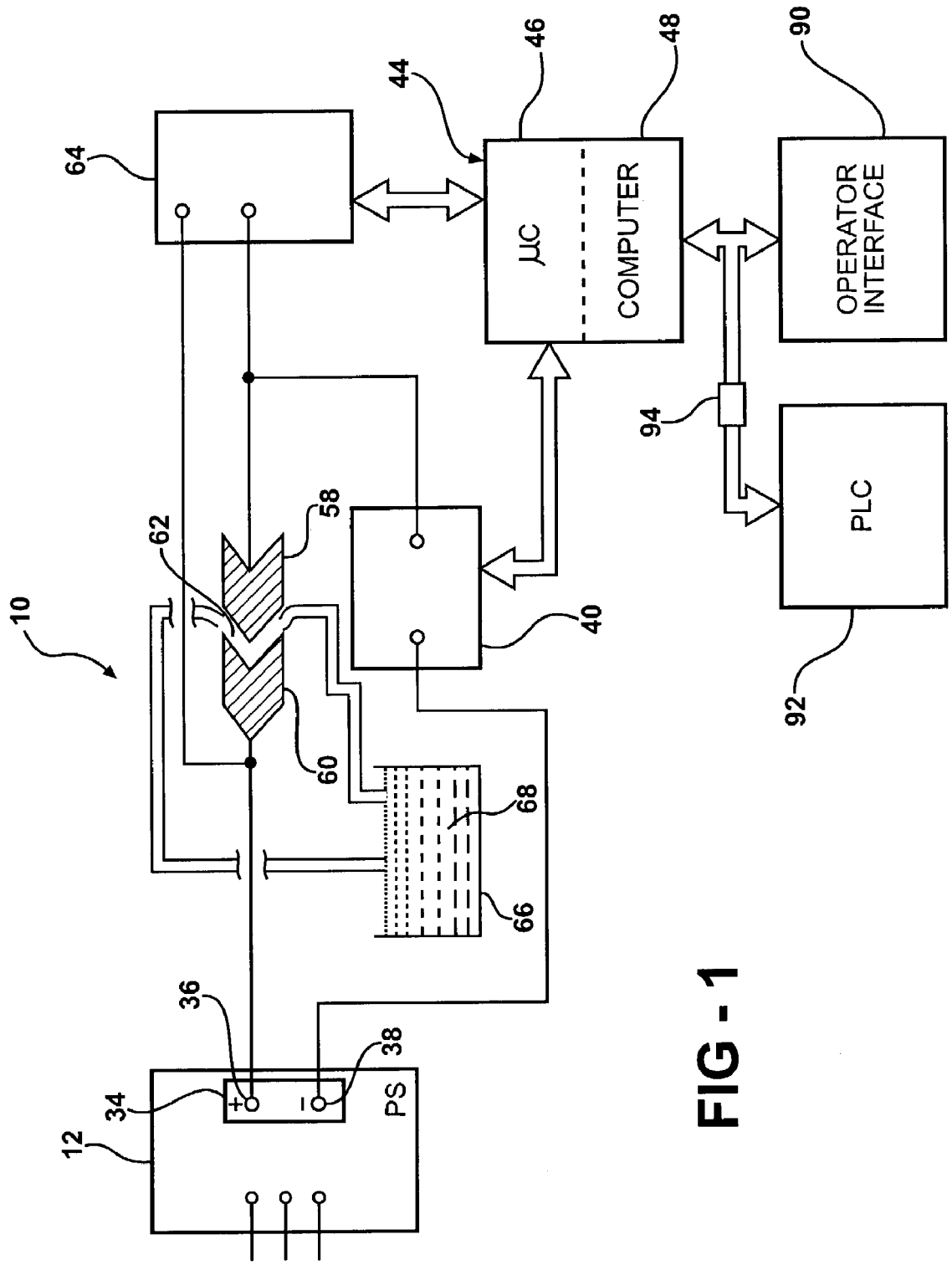
FIG. 1 is a block diagram of an electrochemical machining apparatus.

Referring to the Figures, wherein like numerals indicate like or corresponding parts throughout the several views, an electrochemical machining apparatus is shown at 10 in FIG. 1.

Figure 2:
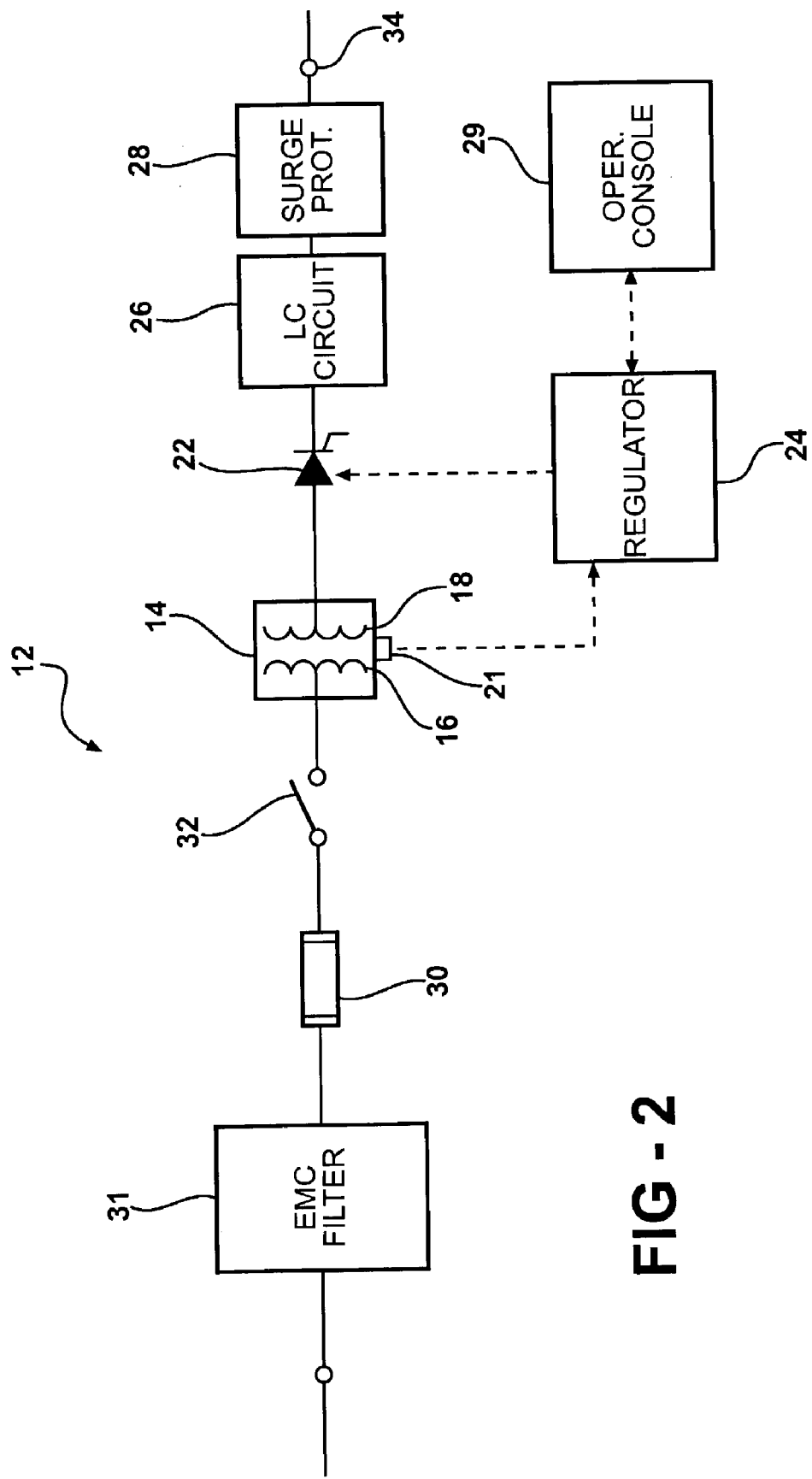
FIG. 2 is a one-line electrical schematic diagram of a power supply of the electrochemical machining apparatus.

The apparatus includes a power supply 12 to provide a DC electric power having a direct current. Referring to FIG. 2, the power supply 12 converts an AC electric power having an alternating current into the DC electric power. In one embodiment, the voltage of the AC electric power has three phases and is rated at approximately 220 $V_{RMS}$. However, it is appreciated by those skilled in the art that the power supply 12 could be easily modified to accommodate various sources of AC electric power with various characteristics. An electromagnetic compatibility filter 31 may also be provided to filter RF noise from the AC electric power.

In the illustrated embodiment, the power supply 12 includes a transformer 14 having a high side 16 and a low side 18 for reducing the voltage of the AC electric power. The high side 16 of the transformer 14 is connected to the AC electric power. A reduced-voltage AC electric power results at the low side 18 of the transformer 14. The transformer 14 has a plurality of taps (not shown) to control a voltage of the reduced-voltage AC electrical power. In one embodiment, the transformer 14 is air-cooled and includes at least one temperature sensor 21 for monitoring the temperature of the transformer 14.

The power supply 12 also includes a plurality of silicon controlled rectifiers 22 (SCRs) connected to the low side 18 of the transformer 14 for converting the reduced-voltage AC electric power to a DC electric power having a direct current. The power supply 12 further includes a regulator 24 operatively connected to the SCRs 22 for controlling the SCRs 22 to regulate a voltage of the DC electric power. The regulator 24 is also connected to the temperature sensor 21.

The power supply 12 may also include an LC circuit 26 operatively connected to the SCRs 22 to reduce an AC ripple in the DC electric power. The LC circuit 26 also provides a capacitive charge that helps to stabilize the DC electric power.

Furthermore, the power supply 12 may include a surge protector 28 to prevent surges in the DC electric power from being back-fed into the power supply 12. An operator console 29 allows an operator to change characteristics of the power supply, including fine-tuning the voltage by adjusting the regulation of the SCRs. The power supply 12 may also include a fuse 30 and a switch 32.

In one embodiment, the voltage of the DC electric power is rated at 35 volts. Also in the one embodiment, an initial current of the DC electric power is 2800 amperes, while a steady-state current of the DC electric power is 800 amperes.

Referring again to FIG. 1, an output 34 of the power supply 12 includes a positive output 36 and a negative output 38 wherein the DC electric power flows out of the positive output 36 and into the negative output 38. A switching portion 40 is connected to the power supply 12 to interrupt the DC electric power. This interruption is capable of producing a pulse of DC electric power having a current greater than about 100 amperes and a minimum pulse duration of less than 10 microseconds. The pulse of DC electric power also has a minimum voltage rise and fall time of less then 100 nanoseconds. A pulse duration of less than 10 microseconds is necessary to provide high resolution machining tolerances of 10 micrometers (microns) or less.

Figure 3:
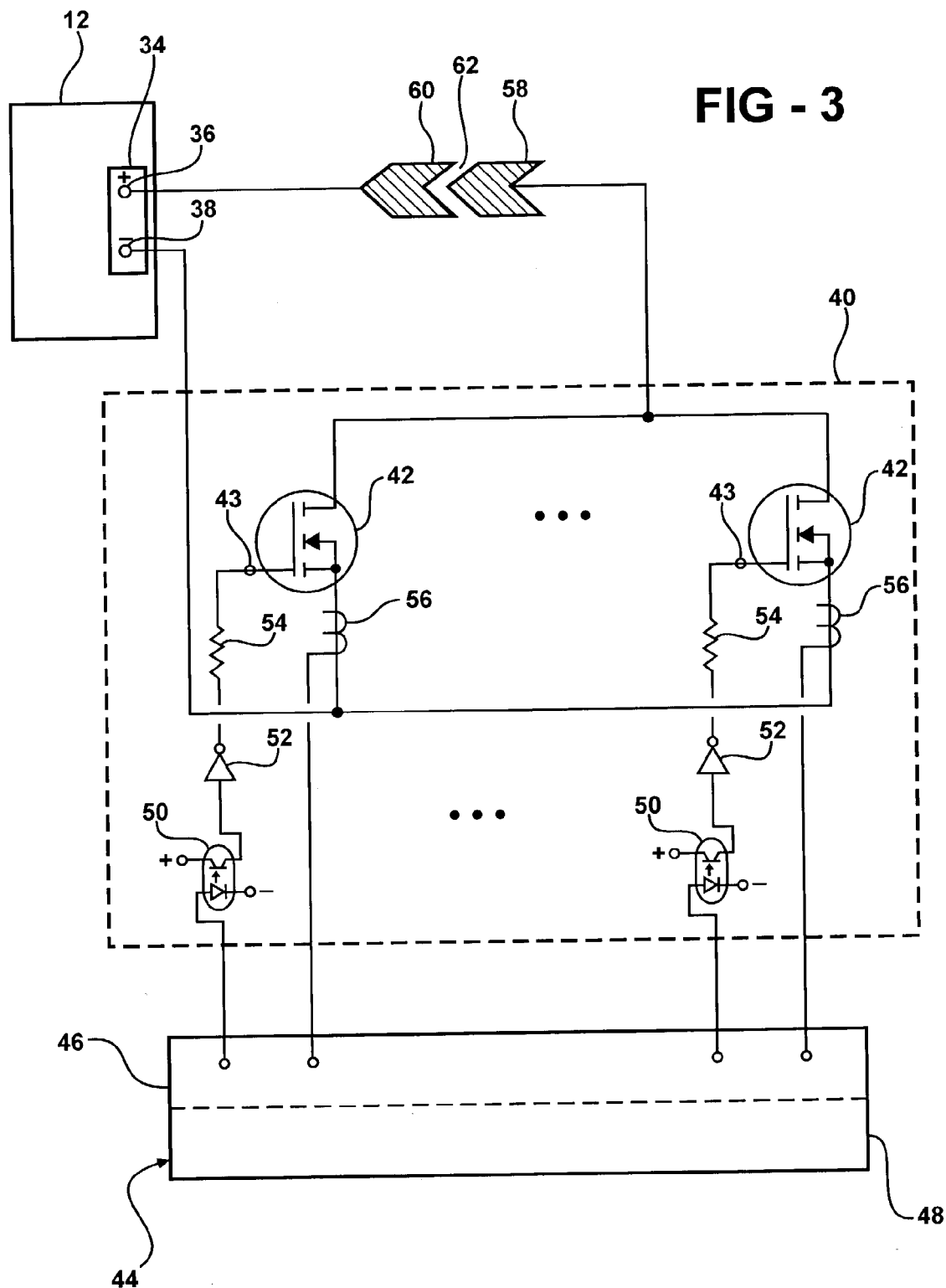
FIG. 3 is an electrical schematic diagram showing details of a switching portion of the electrochemical machining apparatus.

Now referring to FIG. 3, the switching portion 40 further comprises a plurality of transistors 42, connected in parallel, that are capable of quickly switching ON and OFF to create the pulse of DC electric power. In one embodiment, the plurality of transistors 42 are of a metal-oxide-silicon field-effect type. An example of a suitable transistor is the 2SK1381 manufactured by the Toshiba Corporation of Tokyo, Japan. This particular transistor has a drain-source voltage rating of 100 volts, a continuous drain current rating of 50 amps, a momentary drain current rating of 200 amps, and a typical drain-source ON resistance of 0.025 ohms. The subject invention utilizing 20 to 30 of these transistors 42 is capable of producing a pulse a maximum peak current of 2,800 amperes and a load impedance of 0.06 ohms. The low load impedance allows for fast switching speed of the transistors with low energy loss.

A controller 44 is operatively connected to the switching portion 40 to control the switching portion 40. In the preferred embodiment, the controller 44 comprises a microcontroller 46 and a computer 48 in connection with each other. However, it will be appreciated by those skilled in the art that a single computing device could be used for the controller 44.

An example of a suitable microcontroller 46 is the PIC17C44/JW manufactured by Microchip Technology Inc. of Chandler, Ariz. The PIC17C44/JW is an 8-bit CMOS microcontroller with 8 kilobytes of EPROM memory and provides a 121-nanosecond instruction cycle when operated with a 33 MHz clock. The fast instruction cycle time is necessary to achieve fast switching of the switching portion 40. Of course, as is evident to those skilled in the art, other comparable microcontrollers could also be utilized.

In one embodiment, the computer 48 provides a signal to the microcontroller 46 to trigger the pulse of DC electric power. The microcontroller 46 is operatively connected to the transistors 42 to control the switching ON and OFF of the transistors 42. An optoisolator 50 may be connected between the microcontroller 46 and a gate 43 of each transistor 42. Furthermore, an inverter 52 and a resistor 54 may be connected together in series and disposed between each optoisolator 50 and the gate 43 of each transistor 42. The optoisolators 50 serve to electrically isolate the transistors 42 from the microcontroller 46. The inverters 52 change a logic-level of a signal from the microcontroller 46 from "0" to "1" or vice-versa. The resistors 54 provide a biasing-current necessary to drive the transistors 42.

The switching portion 40 further includes a plurality of current sensors 56 operatively connected to the transistors 42 and operatively connected to the controller 44 for sensing an amount of current flowing through each transistor 42. If the amount of current flowing through the transistor 42 reaches a pre-determined value, the microcontroller 44 disables the transistor 42. The pre-determined value typically corresponds to a physical limitation of the transistor 42.

Referring again to FIG. 1, the electrochemical machining apparatus 10 also includes an electrode 58 electrically connected to the switching portion 40. The electrode 58 may also be referred to as a cathode. A workpiece 60 positioned near the electrode 58 forms a gap 62 between the workpiece 60 and the electrode 58. The workpiece 60 is preferably connected to the positive output 36 of the power supply 12. The workpiece 60 may also be referred to as an anode. An electrolyte supply 66 supplies an electrolyte 68 that flows through the gap 62. The electrolyte 68 is in contact with the workpiece 60 and the electrode 58 for creating an electrical circuit for the pulse of DC electric power to conduct through.

A short-circuit detector 64 may be operatively connected to the electrode 58 and the workpiece 60 for detecting a short-circuit between the electrode 58 and the workpiece 60. The short-circuit detector 64 is also operatively connected to the controller 44 for turning OFF the pulse of DC electric power if the short-circuit is detected. The short-circuit detector 64 is capable of sensing a short-circuit before pulses are applied to the electrode 58. The short-circuit detector 64 is also capable of sensing a short-circuit while pulses are applied to the electrode 58.

Figure 4:
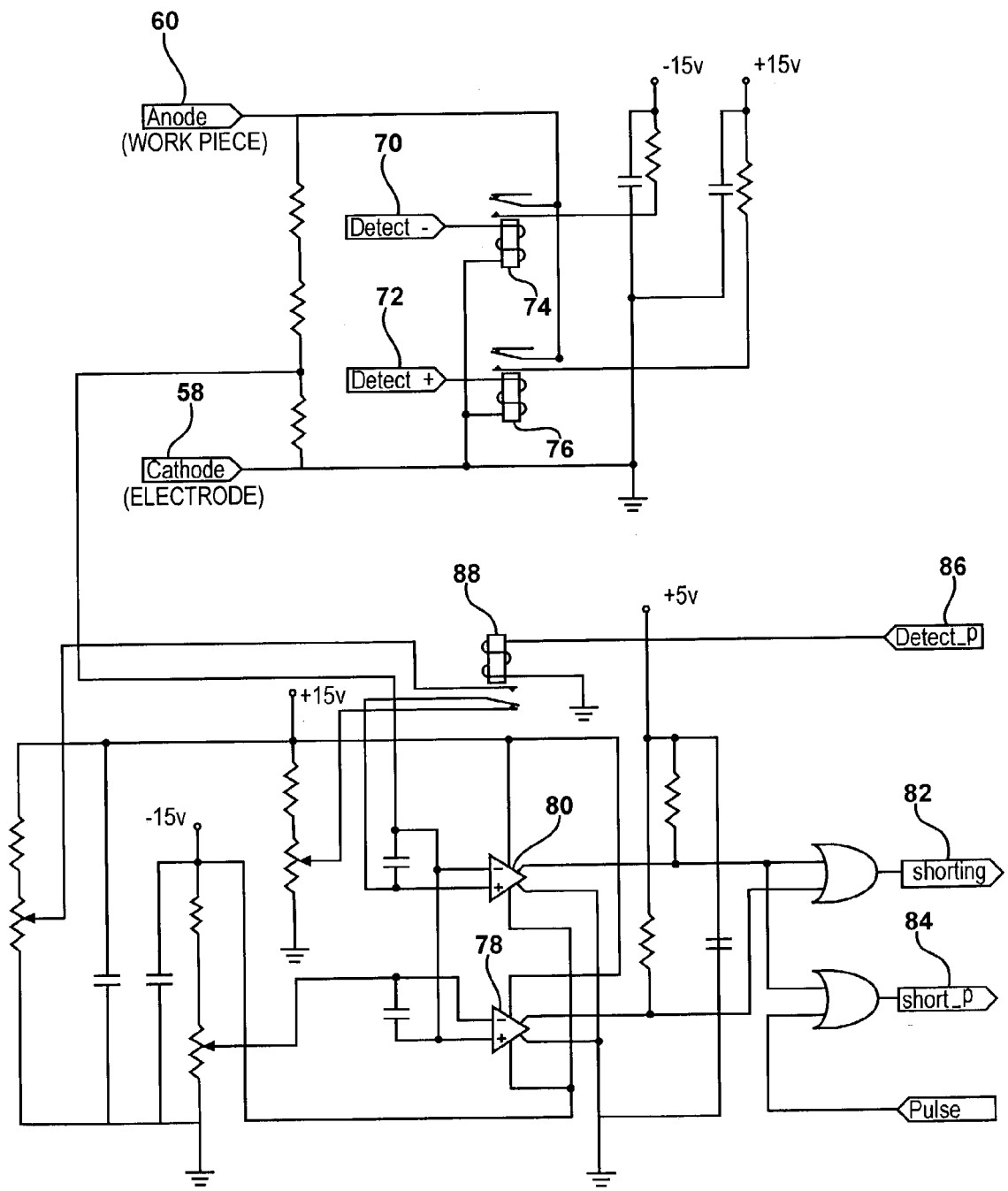
FIG. 4 is an electrical schematic diagram showing details of a short-circuit detector of the electrochemical machining apparatus.
Figure 5B:
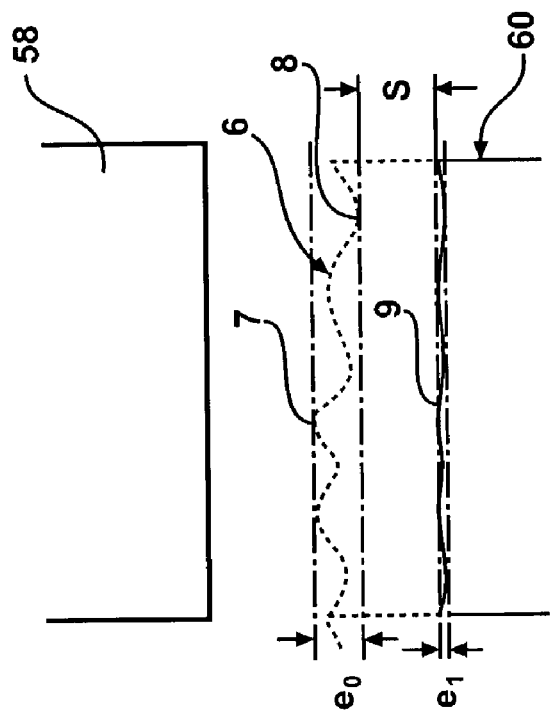
FIG. 5b is a cross-sectional view of a workpiece before and after an electrochemical machining process of the present invention, wherein pulses of electrical power are have a duration less than 10 microseconds.
Figure 5A:
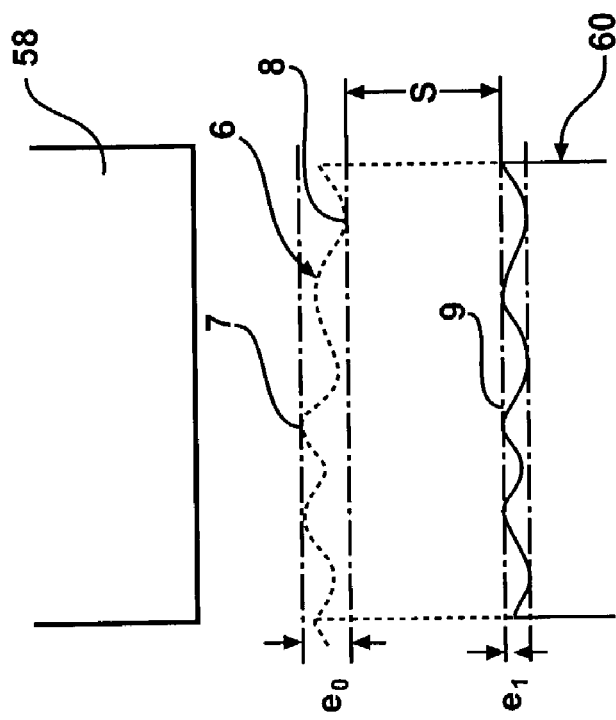
FIG. 5a is a cross-sectional view of a workpiece before and after an electrochemical machining process of the related art, wherein pulses of electrical power are have a duration greater than 10 microseconds.

One embodiment of a short-circuit detector is shown in detail in FIG. 4. Several signals exist between the short-circuit detector and the controller. A DETECT− signal 70 and a DETECT+ signal 72 are sent from the controller when sensing a short-circuit before pulses are applied to the electrode 58. When the DETECT− signal 70 is activated, a first relay 74 is energized, allowing a negative voltage source to be applied to the workpiece 60. A sensed voltage is then sensed and sent to a first opamp 78 where it is compared to a negative reference voltage. The first opamp 78 will generate a SHORTING signal 82 if a short-circuit is present. The SHORTING signal 82 is then sent to the controller 44. A similar process occurs with a positive voltage source when the DETECT− signal 70 is deactivated and the DETECT+ signal 72 is activated. A second relay 76 is activated and a second opamp 80 performs a comparison between the sensed voltage and a positive reference voltage. A DETECT_P signal 86 is activated when sensing a short-circuit while a pulse is applied to the electrode 58. The DETECT_P signal 86 activates a third relay 88 which allows the second opamp 80 to perform a comparison between the sensed voltage and a pulsing reference voltage. A SHORT_P signal 84 is generated when a short-circuit is detected during the pulsing cycle. The SHORT_P signal 84 is then sent to the controller 44. The controller 44 contains software for controlling a short-circuit detection process which sequences the DETECT− signal 70, the DETECT+ signal 72, and the DETECT_P signal 86 at the appropriate times.

Referring again to FIG. 1, an operator interface 90 is operatively connected to the controller 44 for allowing the operator to adjust parameters of the controller 44. These parameters include, but are not limited to, duration of the pulse, duration between the pulses, operation run-time, etc. The operator interface 90 also allows the operator obtain information about the apparatus 10, including, but not limited to, power consumption, short-circuit alarms, etc.

In one embodiment, a programmable logic controller (PLC) 92 is operatively connected to the controller 44. The PLC 92 allows the electrochemical machining apparatus 10 to interface with other machines and processes in an overall manufacturing system. The PLC 92 may be electrically isolated from the controller 44 with an optoisolator circuit 94.

The invention has been described in an illustrative manner, and it is to be understood that the terminology which has been used is intended to be in the nature of words of description rather than of limitation.

Obviously, many modifications and variations of the present invention are possible in light of the above teachings, therefore, to be understood that within the scope of the appended claims, the invention may be practiced otherwise than as specifically described.

What is claimed is:

1. A method for electrochemically machining a work piece comprising the steps of:
    positioning an electrode near the work piece to form a gap between the electrode and the work piece;
    providing a flow of an electrolyte through the gap;
    forming a circuit to allow electrical power to flow through the electrode, the electrolyte in the gap, and the workpiece; and
    generating a pulse of electrical power with a voltage less than or equal to 35 volts DC and a current greater than about 100 amperes and a pulse duration of less than about 10 microseconds to erode material from the work piece.

2. A method as set forth in claim 1 further comprising the step of detecting a short-circuit between the electrode and the workpiece.

3. A method as set forth in claim 2 wherein the step of detecting a short-circuit between the electrode and the workpiece comprises the step of measuring a voltage between the electrode and the workpiece to detect a short-circuit before the generation of a pulse of electric power.

4. A method as set forth in claim 3 further comprising the step of deactivating the generation of a pulse of electric power if a short-circuit is detected.

5. A method as set forth in claim 2 wherein the step of detecting a short-circuit between the electrode and the workpiece comprises the step of measuring a voltage between the electrode and the workpiece to detect a short-circuit during the generation of a pulse of electric power.

6. A method as set forth in claim 5 further comprising the step of stopping the generation of a pulse of electric power if a short-circuit is detected.

7. A method as set forth in claim 1 wherein a plurality of transistors generates the pulse of electrical power and the method further comprises the step of sensing an amount of current flowing through each of the plurality of transistors.

8. A method as set forth in claim 7 further comprising the step of deactivating one of the plurality of transistors if the amount of current flowing through the transistor exceeds a predetermined value.

9. A method as set forth in claim 1 wherein the pulse of electrical power generates a current greater than about 500 amperes.

10. A method as set forth in claim 1 wherein the pulse of electrical power generates a current greater than about 2500 amperes.

11. A method as set forth in claim 1 wherein the minimum pulse duration is maintained between about 2 microseconds and about 10 microseconds.

12. A method as set forth in claim 10 wherein the minimum pulse duration is maintained between about 2 microseconds and about 10 microseconds.

* * * * *

UNITED STATES PATENT AND TRADEMARK OFFICE
CERTIFICATE OF CORRECTION

| | |
|---|---|
| PATENT NO. | : 7,175,752 B2 |
| APPLICATION NO. | : 10/442472 |
| DATED | : February 13, 2007 |
| INVENTOR(S) | : Yuefeng Luo |

It is certified that error appears in the above-identified patent and that said Letters Patent is hereby corrected as shown below:

Column 1, line 30: "of 300 amperes/cm However" should read --of 300 amperes/cm$^2$. However--.

Title Page #75
Inventor Name: "Yufeng Luo" should read --Yuefeng Luo--.

Signed and Sealed this

Tenth Day of July, 2007

JON W. DUDAS
*Director of the United States Patent and Trademark Office*